US012581283B2

(12) United States Patent
Nuggehalli et al.

(10) Patent No.: US 12,581,283 B2
(45) Date of Patent: Mar. 17, 2026

(54) MANAGING DOWNLINK DATA DURING TRANSITIONS BETWEEN MOBILE NETWORKS

(71) Applicant: Google LLC, Mountain View, CA (US)

(72) Inventors: Pavan Nuggehalli, Mountain View, CA (US); Shivank Nayak, Mountain View, CA (US); Jibing Wang, Mountain View, CA (US)

(73) Assignee: Google LLC, Mountain View, CA (US)

( * ) Notice: Subject to any disclaimer, the term of this patent is extended or adjusted under 35 U.S.C. 154(b) by 365 days.

(21) Appl. No.: 18/250,077

(22) PCT Filed: Oct. 22, 2021

(86) PCT No.: PCT/US2021/056151
§ 371 (c)(1),
(2) Date: Apr. 21, 2023

(87) PCT Pub. No.: WO2022/087337
PCT Pub. Date: Apr. 28, 2022

(65) Prior Publication Data
US 2023/0396986 A1 Dec. 7, 2023

Related U.S. Application Data

(60) Provisional application No. 63/104,512, filed on Oct. 22, 2020.

(51) Int. Cl.
*H04W 8/20* (2009.01)
*H04W 8/18* (2009.01)
*H04W 28/06* (2009.01)

(52) U.S. Cl.
CPC ............. *H04W 8/20* (2013.01); *H04W 8/183* (2013.01); *H04W 28/06* (2013.01)

(58) Field of Classification Search
CPC ....... H04W 8/20; H04W 8/183; H04W 28/06; H04W 88/06; H04W 76/15
See application file for complete search history.

(56) References Cited

U.S. PATENT DOCUMENTS

2013/0260740 A1    10/2013   Rayavarapu
2014/0044099 A1     2/2014   Sfar
(Continued)

FOREIGN PATENT DOCUMENTS

CN          106031240 A    10/2016
EP           3301988 A1    4/2018
(Continued)

OTHER PUBLICATIONS

International Search Report and Written Opinion for International Application No. PCT/US2021/050335 mailed on Jan. 26, 2022.
(Continued)

*Primary Examiner* — Mandish K Randhawa
(74) *Attorney, Agent, or Firm* — Womble Bond Dickinson (US) LLP

(57) ABSTRACT

A method in a user equipment (UE) having a first subscriber identity module for connecting to a first mobile network according to a first subscription and a second subscriber identity module for connecting to the first mobile network or a second mobile network according to a first second includes determining, by processing hardware, a preference of how the first mobile network is to process downlink data for the UE when the UE transitions from the first subscription to the second subscription (1102); and transmitting, by the processing hardware and to the first mobile network, an indication of the preference, to cause the first mobile network to process the downlink data for the UE based at least in part on the preference (1104).

20 Claims, 10 Drawing Sheets

(56)                    References Cited

U.S. PATENT DOCUMENTS

| | | |
|---|---|---|
| 2014/0220981 A1 | 8/2014 | Jheng et al. |
| 2016/0050049 A1 | 2/2016 | Yang et al. |
| 2016/0219421 A1 | 7/2016 | Shi et al. |
| 2017/0094568 A1 | 3/2017 | Yang et al. |
| 2018/0049075 A1 | 2/2018 | Mujtaba et al. |
| 2018/0132289 A1 | 5/2018 | Zhao et al. |
| 2018/0146365 A1 | 5/2018 | Dhanapal et al. |
| 2020/0037220 A1 | 1/2020 | Velev et al. |
| 2020/0037380 A1 | 1/2020 | Qiu et al. |
| 2020/0329455 A1 | 10/2020 | Ryu et al. |
| 2022/0312538 A1* | 9/2022 | Zhang ................. H04W 68/005 |
| 2023/0056442 A1* | 2/2023 | Ly ......................... H04W 24/08 |
| 2023/0189268 A1* | 6/2023 | Kim ..................... H04W 72/21 |
| | | 370/329 |

FOREIGN PATENT DOCUMENTS

| | | | |
|---|---|---|---|
| WO | 2020197695 | A1 | 10/2020 |
| WO | 2020209620 | | 10/2020 |
| WO | 2020209641 | A1 | 10/2020 |
| WO | 2020252621 | A1 | 12/2020 |

OTHER PUBLICATIONS

Chinese Office Action in related Chinese application 202180072172.8 dated Jul. 9, 2025, pp. 1-6.

3GPP TR 23.761 V0.4.0 (Jun. 2020) Technical Report, 3rd Generation Partnership Project; Technical Specification Group Services and System Aspects; Study on system enablers for devices having multiple Universal Subscriber Identity Modules (USIM), Release 17.

* cited by examiner

400 ⬎

600

700

900

1000

1100

1200

MANAGING DOWNLINK DATA DURING TRANSITIONS BETWEEN MOBILE NETWORKS

CROSS-REFERENCE TO RELATED APPLICATIONS

This application is a U.S. National Phase under 35 U.S.C. § 371 of and claims benefits and priority of the International Application No. PCT/US2021/056151 filed on Oct. 22, 2021, which claims priority under applicable law of U.S. Provisional Patent Application No. 63/104,512 filed Oct. 22, 2020, the entirety of which are hereby incorporated by reference.

FIELD OF THE DISCLOSURE

This disclosure relates generally to wireless communications and, more particularly, to managing downlink data when a device transitions from one mobile network to another mobile network.

BACKGROUND

This background description is provided for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A device which an end user can use to communicate via a mobile network, usually referred to as "user equipment" (UE), in some cases is capable of communicating with more than one mobile network. For example, the UE can include more than one identity specific to a certain network provider, and can use these identities to connect to different mobile networks as a respective subscriber.

For example, the UE can include more than one Universal Subscriber Identity Module (USIM), which is a software module that executes on a Universal Integrated Circuit Card (UICC) to provide security and authentication functionality, or more than one embedded SIM (e-SIM). In any case, hardware and/or software components can provide multiple subscriber identities. Using one of these subscriber identities, the UE can connect to a certain mobile network such as a Public Land Mobile Network (PLMN) and utilize some or all of the services of the PLMN (e.g., voice calling, video calling, web browsing). The UE then connects to another PLMN or the same PLMN using another subscriber identity, without the user powering down or resetting the UE, let alone replacing any part of the hardware such as a physical card. Nevertheless, the UE may not be able to exchange user-plane data with both PLMNs at the same time.

Today, it is not clear how a PLMN should treat data addressed to the UE when the UE temporarily transitions to another PLMN. For example, a UE equipped with respective USIMs for $PLMN_1$ and $PLMN_2$ may at some point receive a paging request from $PLMN_2$ while receiving data service from $PLMN_1$. The UE may transition to $PLMN_2$ at least temporarily while $PLMN_1$ continues receiving downlink data for delivery to the UE via a radio interface.

SUMMARY

Generally speaking, a UE of this disclosure has multiple subscriber identities for communicating with multiple respective mobile networks, or the same mobile network according to different subscriptions. The device determines its preference regarding how a mobile network should process downlink data addressed to the device when the device transitions from the current subscription to another subscription.

One example embodiment of these techniques is a method in a UE having a first subscriber identity module for connecting to a first mobile network according to a first subscription and a second subscriber identity module for connecting to the first mobile network or a second mobile network according to a second subscription. The method can be implemented by processing hardware such as one or more processors executing instructions stored on a non-transitory computer readable medium and includes determining a preference of how the first mobile network is to process downlink data for the UE when the UE transitions from the first subscription to the second subscription; and transmitting, to the first mobile network, an indication of the preference, to cause the first mobile network to process the downlink data for the UE based at least in part on the preference.

Another example embodiment of these techniques is a UE including processing hardware and configured to implement the method above.

Still another example embodiment of these techniques is a method in a first mobile network for processing downlink data for a UE having a first subscriber identity module for connecting to the first mobile network according to a first subscription and a second subscriber identity module for connecting to the first mobile network or a second mobile network according to a second subscription. The method can be implemented by processing hardware such as one or more processors executing instructions stored on a non-transitory computer readable medium and includes receiving, from the UE, an indication of how the UE prefers the first mobile network to process downlink data for the UE when the UE transitions from the first subscription to the second subscription; detecting that the UE has transitioned from the first subscription to the second subscription; and processing downlink data for the UE based at least part on the indication.

Yet another example embodiment of these techniques is a base station including processing hardware and configured to implement one of the methods above.

DETAILED DESCRIPTION OF THE DRAWINGS

Figure 1:
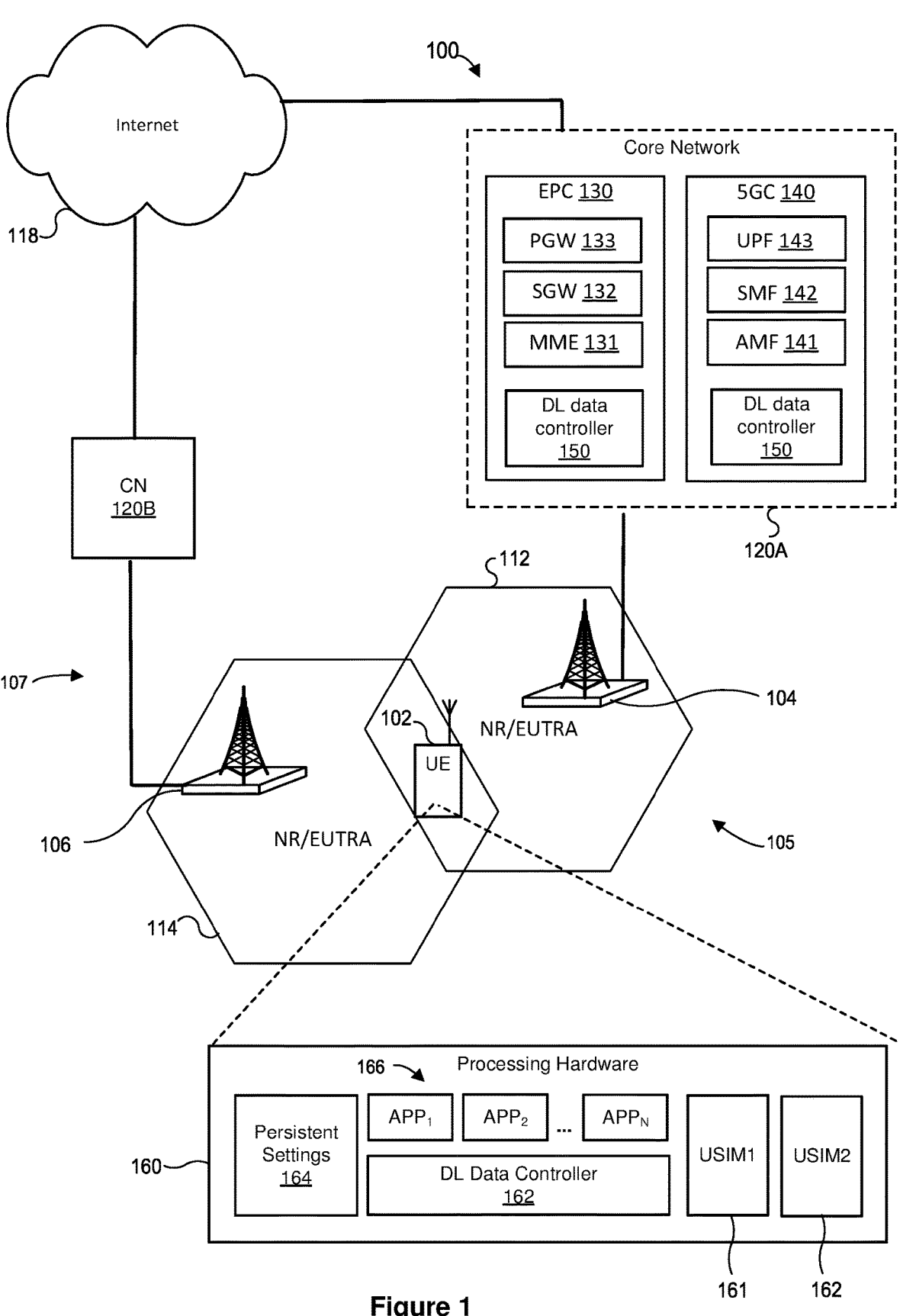
FIG. 1 is a block diagram of an example system in which a mobile network and/or a user equipment (UE) can implement techniques of this disclosure for managing downlink data addressed to the UE, when the UE equipped with multiple subscriber identity modules at least temporarily transitions to another mobile network.

FIG. 1 illustrates an example wireless communication system 100 in which a UE 102 is a multi-USIM device that implements the techniques of this disclosure. The UE 102 communicates with a base station 104, which operates in a radio access network (RAN) 105 coupled to a core network (CN) 120A, as well as with the base station 106, which operates in a RAN 107 coupled to a CN 120B. The RAN 105 and the core network 120A are associated with $PLMN_1$, and the RAN 107 and the CN 120B are associated with $PLMN_2$.

As discussed in more detail below, the UE 102 determines its preference with respect to downlink data which a mobile network such as $PLMN_1$ may receive for the UE 102 when the UE 102 has at least temporarily transitioned to another mobile network such as $PLMN_2$ or to another subscription on $PLMN_1$ The preference can be, for example, for the mobile network to buffer pending downlink data, discard pending downlink data, buffer newly arriving downlink data, and/or discard newly arriving downlink data. The UE 102 can determine the preference and indicate the preference to the mobile network, which in turn may process downlink data for the UE in accordance with the preference, unless the preference conflicts with one or more policies of the mobile network.

For clarity, the examples below refer primarily to the UE transitioning between a subscription on $PLMN_1$ and a subscription $PLMN_2$. These techniques however also apply to the UE transitioning between subscriptions on the same PLMN, unless otherwise stated.

The UE 102 can determine this preference dynamically and/or statically. For example, the UE can determine its preference upon receiving a paging request from a new (second) mobile network, and base the determination on the type of data the UE 102 is currently receiving from the first mobile network, and/or how long the UE 102 expects to communicate with the second mobile network (which in turn may depend on what kind of service the UE expects to use with the second mobile network). Additionally or alternatively, the UE 102 can store persistent settings, which may be user-specific or manufacturer-specific for example.

Further, the UE 102 can specify its preference at various levels of granularity, e.g., for all downlink data, for downlink data associated with a particular PDU session or PDN connection, or for downlink data associated with a particular QoS flow or EPS bearer. The UE 102 can provide the reference to the mobile network using Non-Access Stratum (NAS) messaging or Radio Resource Control (RRC) messaging, depending on the implementation and/or scenario.

As illustrated in FIG. 1, the base station 104 supports a cell 112, and the base station 106 supports a cell 114. The cells 112 and 114 can partially overlap, so the UE 102 can receive for example a paging request from $PLMN_2$ in the cell 114 while communicating with $PLMN_1$ in the cell 112. Generally, the wireless communication system 100 may include any suitable number of base stations supporting NR cells and/or EUTRA cells. More particularly, the CNs 120A and 120B can be connected to any suitable number of base stations supporting cells.

The CN 120A may be an evolved packet core (EPC) 130 or a fifth-generation core (5GC) 140, both of which are depicted in FIG. 1. The CN 120B similarly can be implemented as an EPC, a 5GC, or another suitable core network. Each of the base stations 104 and 106 may be an eNB supporting an S1 interface for communicating with the corresponding EPC, an ng-eNB supporting an NG interface for communicating with the corresponding 5GC, or a gNB that supports the NR radio interface as well as an NG interface for communicating with the 5GC. The base station 104 may be an EUTRA-NR DC (EN-DC) gNB (en-gNB) with an S1 interface to the EPC 130, an en-gNB connected to the EPC 130, a gNB that supports the NR radio interface as well as an NG interface to the 5GC 140, or an ng-eNB that supports an EUTRA radio interface as well as an NG interface to the 5GC 140.

Among other components, the EPC 130 can include a Mobility Management Entity (MME) 131, a Serving Gateway (SGW) 132, and a Packet Data Network Gateway (PGW) 133. The MME 131 is generally configured to manage authentication, registration, paging, and other related functions. The SGW 132 is generally configured to transfer user-plane packets related to audio calls, video calls, Internet traffic, etc. The PGW 133 is generally configured to provide connectivity from the UE 102 to one or more external packet data networks, e.g., an Internet network 118 and/or an Internet Protocol (IP) Multimedia Subsystem (IMS) network.

The 5GC 140 includes Mobility Management Function (AMF) 141, an Session Management Function (SMF) 142, and a User Plane Function (UPF) 143. The AMF 141 is generally configured to manage authentication, registration, paging, and other related functions; the SMF 142 is generally configured to manage Protocol Data Unit (PDU) sessions, and the UPF 143 is generally configured to transfer user-plane packets related to audio calls, video calls, Internet traffic, etc.

Each of the components 131-133 and 141-143 can be implemented in processing hardware that can include one or more general-purpose processors such as CPUs and non-transitory computer-readable memory storing machine-readable instructions executable on the one or more general-purpose processors, and/or special-purpose processing units.

Although the examples below refer specifically to specific CN types (EPC, 5GC) and specific radio access technology (RAT) types (5G NR and EUTRA), in general the techniques of this disclosure can also apply to other suitable radio access and/or core network technologies, such as sixth generation (6G) radio access, and/or 6G core network or 5G NR-6G DC, for example.

With continued reference to FIG. 1, the CN 120A can implement a downlink (DL) data controller 150. For example, the DL data controller 150 can be implemented in the SGW 132 when the CN 120A is implemented as an EPC, or the UPF 143 when the CN 120A is implemented as a 5GC. As another example, the DL data controller 150 can be implemented partially in the SMF 142 and partially in the UPF 143. Moreover, the DL data controller 150 in some implementations is partially implemented in the base station 104. The DL controller 150 more generally can be implemented in one or more components of the CN 120A and/or the RAN 105.

In operation, the DL data controller 150 determines the preference of the UE 102 with respect to processing downlink data when the UE 102 temporarily or permanently leaves the $PLMN_1$, in some implementations also determines the relevant policy of the CN 120A, and applies the preference and/or policy in relevant scenarios. Some of the scenarios are discussed below with reference to FIGS. 3-10.

Still referring to FIG. 1, the UE 102 is equipped with processing hardware 160 that can include one or more general-purpose processors such as CPUs and non-transitory computer-readable memory storing machine-readable instructions executable on the one or more general-purpose processors, and/or special-purpose processing units. The UE 102 also includes $USIM_1$ (component 161) and $USIM_2$ (component 162) for communicating with $PLMN_1$ and $PLMN_2$, respectively. In some implementations, however, the UE 102 uses $USIM_1$ as well as $USIM_2$ to communicate with the same mobile network, such $PLMN_1$ or $PLMN_2$, according to different subscriber identities. Either USIM may be associated with a card as a part of a UICC (commonly called a "SIM card") or may be embedded as an eSIM.

The processing hardware 160 in an example implementation includes a DL data controller 162 configured to support the techniques of this disclosure for managing downlink data at the $PLMN_1$. In operation, the DL data controller 162 can determine persistent settings 164 stored in the memory of the UE 102 (e.g., manufacturer settings, operator settings, user settings) and/or the dynamic conditions associated with the applications and services 166 ($APP_1$, $APP_2C$, . . . $APP_N$), such as voice and video call services, SMS services, web browsing applications, mailing applications, gaming applications, or music streaming applications, for example.

Figure 2:
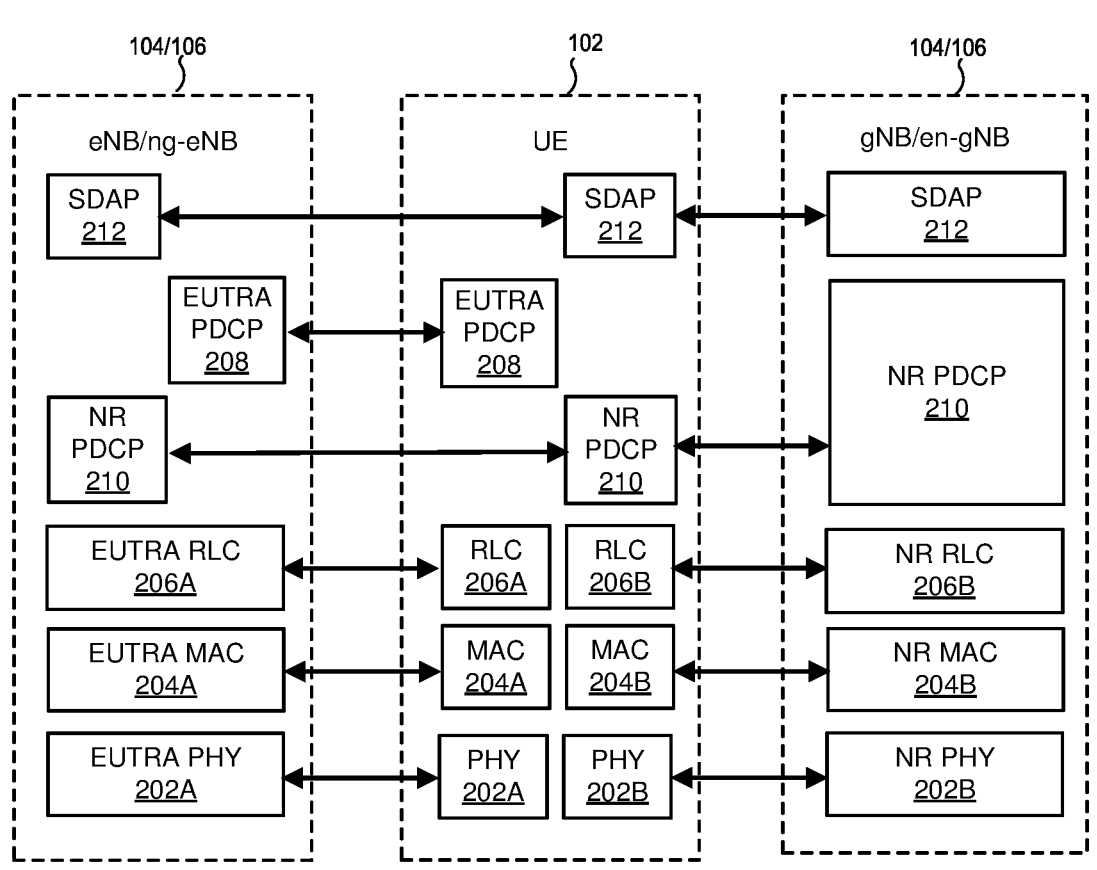
FIG. 2 is a block diagram of an example protocol stack according to which a UE of FIG. 1 can communicate with the base stations of FIG. 1.

Next, FIG. 2 illustrates in a simplified manner a radio protocol stack according to which the UE 102 can communicate with an eNB/ng-eNB or a gNB. Each of the base stations 104, 106 can be the eNB/ng-eNB or the gNB.

The physical layer (PHY) 202A of EUTRA provides transport channels to the EUTRA Medium Access Control (MAC) sublayer 204A, which in turn provides logical channels to the EUTRA Radio Link Control (RLC) sublayer 206A, and the EUTRA RLC sublayer in turn provides RLC channels to the EUTRA PDCP sublayer 208 and, in some cases, NR PDCP sublayer 210. Similarly, the PHY 202B of NR provides transport channels to the NR MAC sublayer 204B, which in turn provides logical channels to the NR RLC sublayer 206B, and the NR RLC sublayer 206B in turn provides RLC channels to the NR PDCP sublayer 210. The UE 102 in some implementations supports both the EUTRA and the NR stack, to support handover between EUTRA and NR base stations and/or DC over EUTRA and NR interfaces. Further, as illustrated in FIG. 2A, the UE 102 can support layering of NR PDCP 210 over EUTRA RLC 206A.

The EUTRA PDCP sublayer 208 and the NR PDCP sublayer 210 receive packets (e.g., from the Internet Protocol (IP) layer, layered directly or indirectly over the PDCP layer 208 or 210) that can be referred to as service data units (SDUs), and output packets (e.g., to the RLC layer 206A or 206B) that can be referred to as protocol data units (PDUs). Except where the difference between SDUs and PDUs is relevant, this disclosure for simplicity refers to both SDUs and PDUs as "packets."

On a control plane, the EUTRA PDCP sublayer 208 and the NR PDCP sublayer 210 provide SRBs to exchange Radio Resource Control (RRC) messages, for example. On a user plane, the EUTRA PDCP sublayer 208 and the NR PDCP sublayer 210 provide DRBs to support data exchange.

When the UE 102 operates in EUTRA/NR DC (EN-DC), with the BS 104 operating as a MeNB and the BS 106 operating as a SgNB, the network can provide the UE 102 with an MN-terminated bearer that uses EUTRA PDCP 208 or MN-terminated bearer that uses NR PDCP 210. The network in various scenarios also can provide the UE 102 with an SN-terminated bearer, which use only NR PDCP 210. The MN-terminated bearer can be an MCG bearer or a split bearer. The SN-terminated bearer can be a SCG bearer or a split bearer. The MN-terminated bearer can be an SRB (e.g., SRB1 or SRB2) or a DRB. The SN-terminated bearer can an SRB (e.g., SRB) or a DRB.

Next, several scenarios in which a mobile network processes downlink data based at least in part on a preference of a UE are discussed with reference to FIGS. 3-10. Although the signaling diagrams of FIGS. 3-8 show two core networks 120A, 120B and assume different PLMNs, the techniques shown also apply to the UE transitioning between different subscriptions on the same PLMN, unless otherwise stated.

Figure 3:
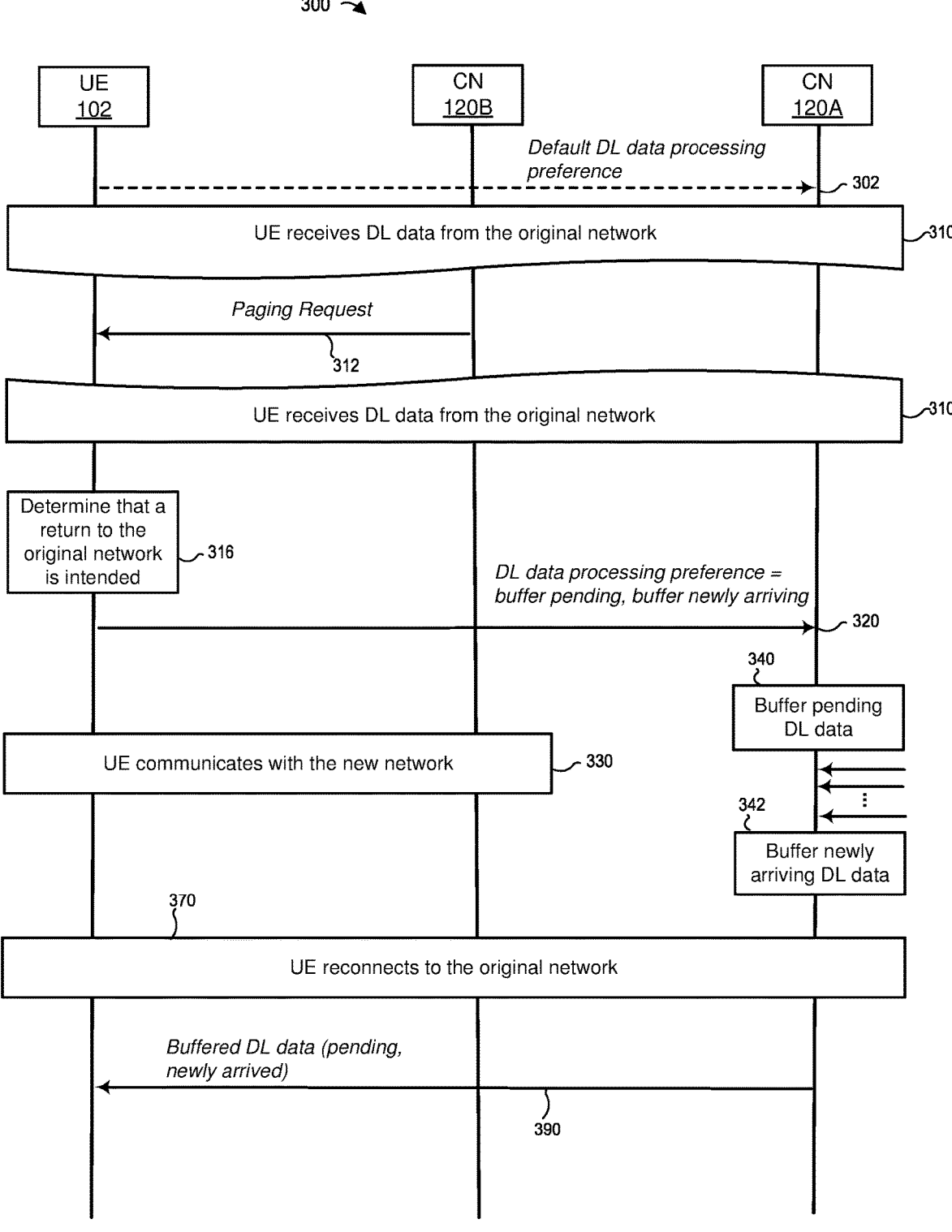
FIG. 3 is a message sequence diagram of a scenario in which the UE requests that the CN buffer the pending downlink data as well as newly arrived data while the UE temporarily connects to a different mobile network.

Referring first to FIG. 3, the UE 102 in a scenario 300 optionally provides 302 an indication of the default preference regarding processing downlink data to the CN 120A. The default preference can apply to situations in which the UE 102 leaves the $PLMN_1$ temporarily (e.g. for an amount of time less than $T_{MAX}$) or permanently (e.g. for an amount of time greater than $T_{MAX}$). The preference can apply to downlink data that is already pending at the time when the UE 102 notifies the $PLMN_1$ of leaving, to downlink data that arrives after the UE 102 has notified the $PLMN_1$ of leaving but before the expiration of time interval $T_{MAX}$, or both. The value of $T_{MAX}$ can be for example 100 ms. 300 ms, 500 ms, 2 secs, or any other value, and can depend on the PLMN, the manufacturer of the UE 102, application servers in communication with the UE, or the relevant 3GPP standard, for example.

In some cases, the CN 120A specifies the value of $T_{MAX}$ to the UE 102 using a NAS message. If the UE 102 fails to return to the CN 120A within the predetermined time period $T_{MAX}$, the CN 120 flushes the stored downlink data as will be described later.

For example, the default preference can be a tuple {buffer, buffer}, {buffer, discard}, {discard, buffer}, or {discard, discard} specifying the default actions for the pending downlink data and the newly arriving downlink data, respectively. In some implementations, the default preference for pending and/or newly arriving data can be set to "do not care" to effectively allow the CN 120A apply its default policy. As another example, the default preference can be "return," indicating that the UE 102 intends to return to PLMN$_1$ to resume an ongoing data transfer (e.g., a PDU session) which an event such as paging request from PLMN$_2$ interrupts, or "not return," indicating that the UE 102 does not intend or expect to return to PLMN$_1$ after transitioning to PLMN$_2$. In this case, the CN 120A can apply the default policy for this preference, e.g., {buffer, buffer} for "return" or {discard, discard} for "not return."

The UE 102 in some implementations can further parameterize the default preference by specifying the maximum amount of data to buffer, for example. Thus, the UE 102 can format the default preference as {buffer X, buffer Y}, to request that the PLMN$_1$ buffer up to X bytes of pending downlink data and up to Y bytes of newly arriving downlink data. The CN 120A similarly can apply, when appropriate, a policy that limits the amount of buffered pending downlink data and/or newly arriving downlink data.

In some implementations, the CN 120A is configured to receive, from the UE 102 or from the CN 120B, an indication of the service in connection with which the CN 120B pages the UE 102 when the UE 102 is communicating with the CN 120A. The CN 120A can determine for example whether the UE 102 received from the CN 120B a paging request for SMS delivery or a paging request for a voice call. When the UE 102 transitions from one subscription to another subscription on the same PLMN, the CN 120A also can identify the service to the which the paging request associated with the new subscription relates. In these cases, the default preference can be service-specific, e.g., {{SMS: buffer, buffer}, {MMS call: buffer, discard}, {Voice call: discard, discard}, . . . }. Alternatively, the UE 102 can specify the preference in terms of the intent associated with a particular service: {{ISMS: return}, {MMS call: return}, {Voice call: not return}, . . . }.

Still further, the default preference in various implementations specifies how the UE 102 would like the CN 120A to process downlink data at various levels of granularity. For example, the UE 102 can specify the preference for a certain Quality of Service (QoS) or an EPS bearer.

In some implementations, the UE 102 provides 302 the default notification to the MME 131 or the AMF 141 during registration using the Mobility Management (MM) protocol. The UE 102 can include an information element (IE) in one of the uplink messages. In another implementation, the UE 102 provides 302 the default notification to the CN 120A only when the UE 102 expects to establish a PDN session or a PDU session using the Session Management (SM) protocol. The UE 102 in some implementations also can provide 302 the default notification in response to the user changing certain settings. In those implementations or scenarios where the UE 102 does not provide a default preference at all, the CN 120A can apply a default policy. In general, the UE 102 can provide the default notification to the CN 120A zero times, once, or multiple times while active in PLMN$_1$.

With continued reference to FIG. 3, the UE 102 can receive 310 downlink data packets in a communication session with the CN 120A. For example, the UE 102 can receive data packets of a certain PDU session which a music playback application 166 established to stream music.

While the UE 102 continues to receive 310 downlink data, the CN 120B transmits a paging request to the UE 102. In some implementations, the paging information includes a service indicator to indicate whether the CN 120B is paging the UE 102 in connection with SMS delivery, MMS delivery, a mobile-terminated voice call, a mobile-terminated video call, etc. In other implementations, the UE 102 cannot determine the type of service when receiving 310 the paging information. The UE 102 in some of these cases can determine the type of service at a later time, based on subsequent messaging with the CN 120B. Further, in some cases it is possible for PLMN$_2$ provide an indication of the service of the paging request directly to PLMN$_1$.

In response to receiving 312 the paging request, the UE 102 determines whether the UE 102 intends (or plans) to return to the CN 120A upon completing the service to which the paging request from the CN 120B relates. As discussed below, the UE 102 may not always determine the intent correctly, and in some cases may re-assess the intent at a later time.

In the scenario of FIG. 3, the UE 102 determines 316 that the UE 102 intends to return to the CN 120A after receiving the information to which the paging request relates. For example, the UE 102 can determine that the paging request relates to SMS or MMS delivery, and that receiving downlink data from the CN 120B can complete within the predetermined time period T$_{MAX}$. The UE 102 transmits 320 an indication of the downlink data processing preference to the CN 120A, to specify the preference of buffering pending downlink data as well as newly arriving pending downlink data. The indication of the event 320 can override the default preference of the event 302.

Similar to the default preference discussed in connection with the event 302, the UE 102 can transmit 320 the preference to the AMF 141 using a NAS message, the AMF 141 can forward the preference to the SMF 142, and the SMF 142 can turn can configure the UPF 143 in accordance with the preference. Alternatively, if the CN 120A is implemented as an EPC, the UE 102 can transmit a NAS message including an indication of the downlink processing preference to the MME 131, which can provide the preference to the SGW 132. As an alternative to NAS message, the UE 102 can use an RRC message, in both E-UTRAN and NG-RAN, to specify the preference to the RAN 105. The base station 104 in this implementation can forward the preference to the AMF 141.

The UE 102 can specify the preference for a particular QoS flow or an EPS bearer. The UE 102 additionally or alternatively can specify the preference for a particular PDU session or a PDN connection. For example, the procedure 310 can involve a PDU session S$_1$ of a web browser and a PDU session S$_2$ of a video streaming application. The UE 102 in this case can transmit 320 multiple PDU-session-specific preferences, e.g., {{S$_1$: buffer, discard}, {S$_2$: buffer, buffer}}. Also similar to the default preference discussed above, the UE 102 can specify buffer size limits for the pending downlink data and/or the newly arriving downlink data.

In some implementations, the UE 102 transmits 320 the preference to the CN 120A after establishing a service with the CN 120B. In other implementations, at the time of transmitting 320 the preference, the UE 102 cannot determine whether the service related to the paging request of the event 312 is SMS or voice call, but the CN 120A may be able to determine the type of service at a later time. The UE 102 in this scenario can specify respective preferences for the multiple services, e.g., {{SMS: buffer, buffer}, {voice call: discard, discard}}. The CN 120A can apply the appropriate preference upon determining for which service the UE 102 transitioned to the other mobile network.

In accordance with the specified preference, the CN 120A buffers 340 pending downlink data (i.e., the data the CN 120A had already received from a data source for the UE 102 by the time the CN 120A received 320 the preference).

The CN 120A also buffers 342 newly arriving downlink data, in accordance with the preference.

Prior to buffering or discarding downlink data in accordance with the UE preference, the CN 120A in some implementations determines whether this preference conflicts with the relevant policy of the CN 120A. The policy can for example restrict the ability of UEs to buffer data at the CN due to memory restrictions. In some cases, the policy is UE-specific. When the CN 120A determines that the UE preference is incompatible with the CN policy, the CN 120A can determine that the CN policy takes precedence over the UE preference. The CN 120A in this case may inform the UE 102 what policy the CN 120A has applied, so that the UE 102 is aware of how the CN 120A will process downlink data. In some of these implementations, the CN 120A transmits an acknowledgement to the transmission 320, with an indication whether the CN 120A accepted the preference of the UE 102 and, if the CN 120A has not fully accepted the preference, what kind of modifications to the preference the CN 120A has applied.

With continued to reference to FIG. 3, the UE 102 communicates 330 with the CN 120B of the new mobile network, PLMN$_2$. The UE 102 then reconnects 370 to the original mobile network, PLMN$_1$. The CN 120A delivers 390 buffered downlink data, which in this case includes the data packets that were pending at the time of the event 320 as well as the data packets that arrived subsequent to the event 320.

Next, several scenarios generally similar to the scenario 300 are discussed below with reference to FIGS. 4-8. Events in these procedure similar to those discussed above with respect to the procedure 300 are labeled with similar reference numbers (e.g., with event 402 of FIG. 4 or event 502 of FIG. 5 corresponding to event 302 of FIG. 3). With the exception of the differences illustrated in FIGS. 4-8 and the differences described below, any of the alternative implementations discussed above with respect to the procedure 300 (e.g., for messaging and processing) may apply to the procedures of FIGS. 4-8.

Figure 4:
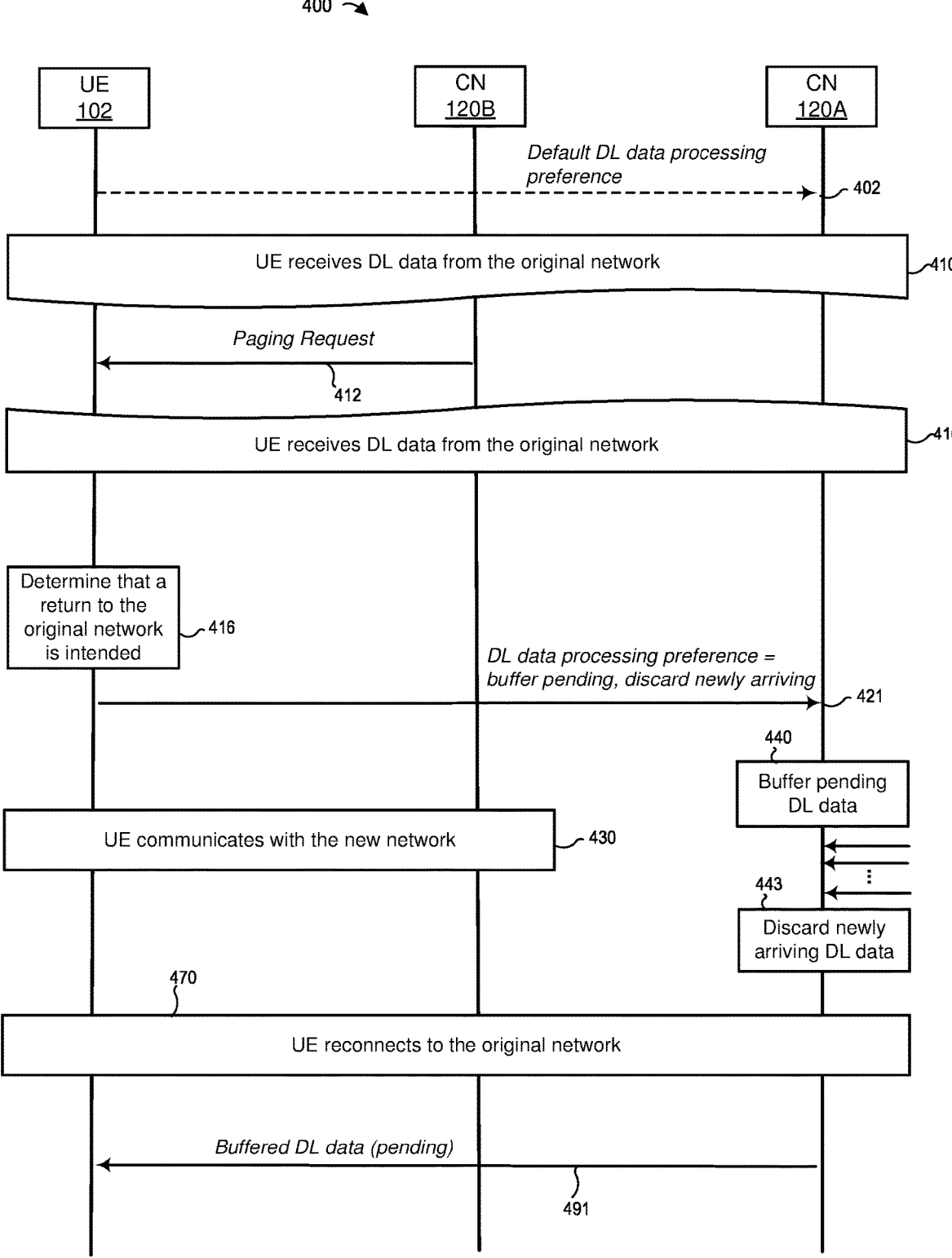
FIG. 4 is a message sequence diagram of a scenario in which the UE requests that the CN buffer the pending downlink data but discard newly arrived data while the UE temporarily connects to a different mobile network.

Referring to FIG. 4, an example scenario 400 is similar to the scenario 300, but here the UE 102 specifies a different preference for processing downlink data. The UE 102 in this scenario also determines 416 that the UE 102 intends to return to the CN 120A after receiving the information to which the paging request relates, within the predetermined time period T$_{MAX}$, but the UE 102 transmits 421 a different indication of the downlink data processing preference to the CN 120A. The UE 102 in the scenario 400 specifies the preference of buffering pending downlink data but discarding newly arriving downlink data. The CN 120A buffers 440 the pending downlink data and discards 443 the newly arriving downlink data, in accordance the preference. After the UE 102 reconnects 470 to the CN 120A, the CN 120A delivers 491 the buffered downlink data, which in this case includes the data packets that were pending at the time of the event 320 but excludes the data packets that arrived subsequent to the event 420.

Figure 5:
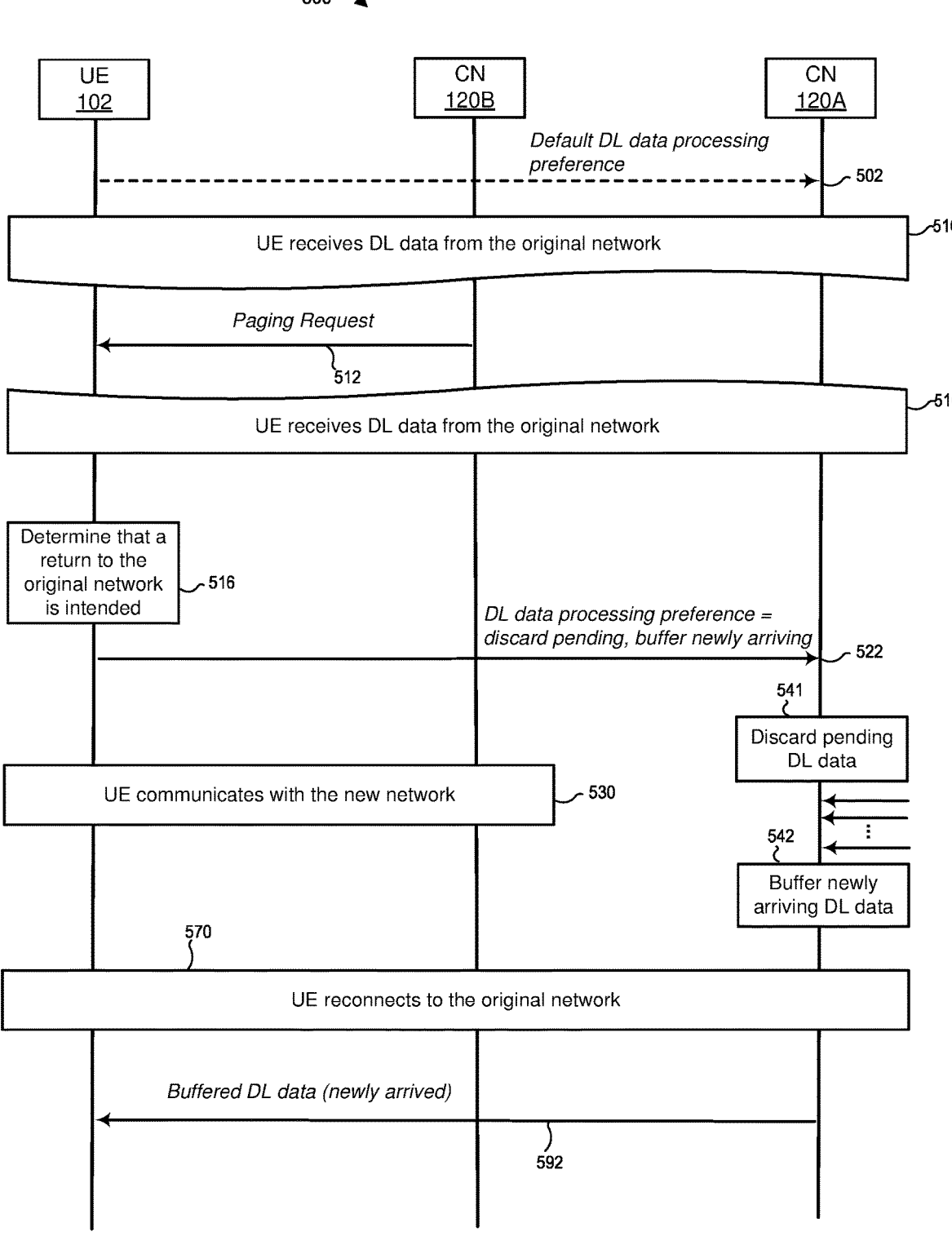
FIG. 5 is a message sequence diagram of a scenario in which the UE requests that the CN discard the pending downlink data but buffer newly arrived data while the UE temporarily connects to a different mobile network.

Next, FIG. 5 illustrates an example scenario 500 also similar to the scenario 300, but with the UE 102 specifying yet another preference for processing downlink data. The UE 102 in this scenario also determines 516 that the UE 102 intends to return to the CN 120A after receiving the information to which the paging request relates, within the predetermined time period T$_{MAX}$, but the UE 102 transmits 522 a preference of discarding pending downlink data but buffering newly arriving downlink data. The CN 120A discards 541 the pending downlink data but buffers 542 the newly arriving downlink data, in accordance the preference. After the UE 102 reconnects 570 to the CN 120A, the CN 120A delivers 582 the buffered downlink data, which in this case excludes the data packets that were pending at the time of the event 320 but includes the data packets that arrived subsequent to the event 420.

Figure 6:
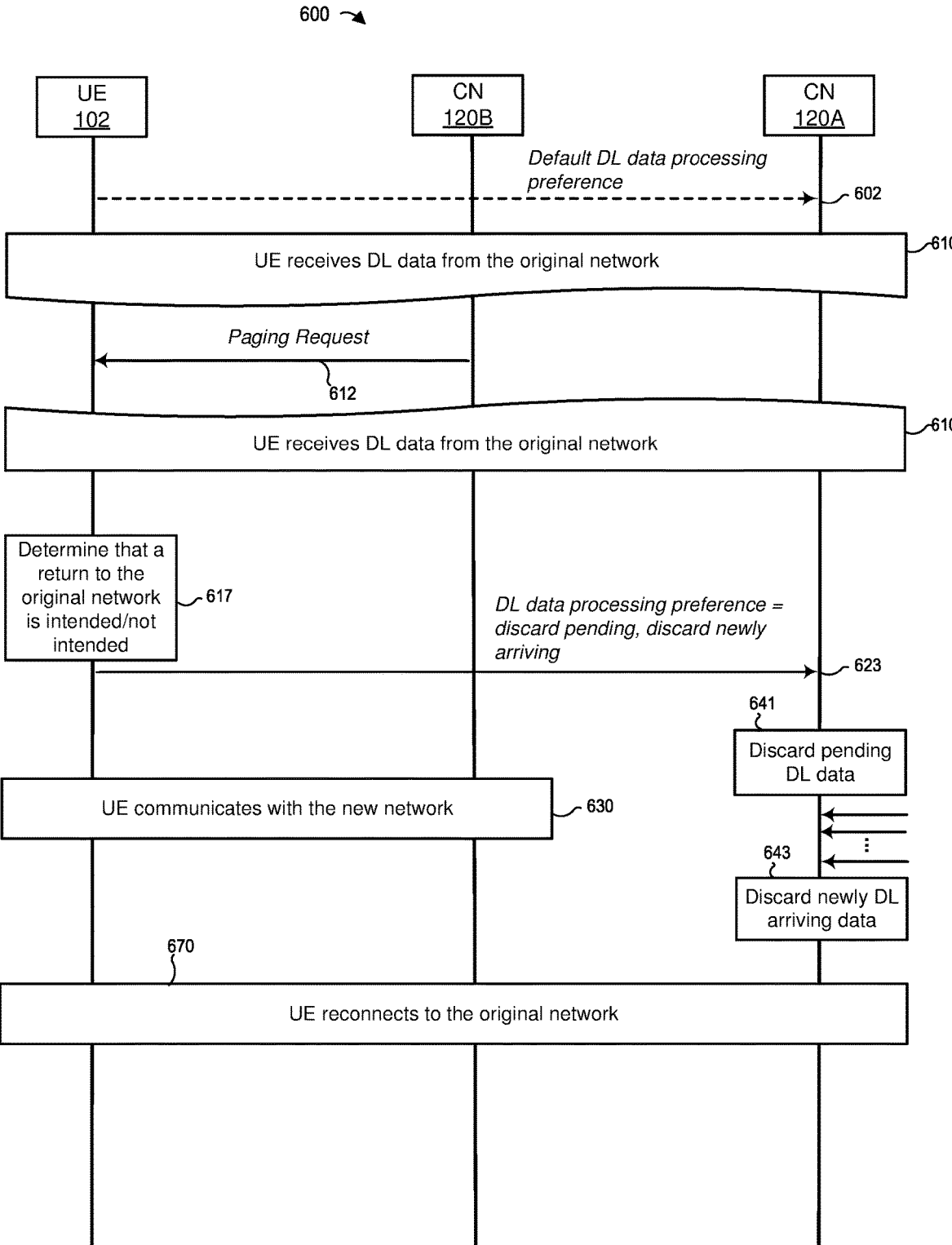
FIG. 6 is a message sequence diagram of a scenario in which the UE requests that the CN discard the pending downlink as well as newly arrived data while the UE temporarily or permanently connects to a different mobile network.

FIG. 6 illustrates an example scenario 600 also similar to the scenario 300, but with the UE 102 specifying still another preference for processing downlink data. The UE 102 in this scenario also determines 617 that the UE 102 does not intend to return to the CN 120A after receiving the information to which the paging request relates within the predetermined time period T$_{MAX}$. Alternatively, the UE 102 determines 617 intends to return to the CN 120A within the predetermined time period T$_{MAX}$, but also determines that the downlink data received at the CN 120A prior to the UE's return should be discarded. The UE 102 transmits 623 a preference of discarding pending downlink data as well newly arriving downlink data. The CN 120A discards 641 the pending downlink data and discards 643 the newly arriving downlink data, in accordance the preference. After the UE 102 reconnects 670 to the CN 120A, the CN 120A need not deliver downlink data the UE 102 missed while communicating with the CN 120B.

Figure 7:
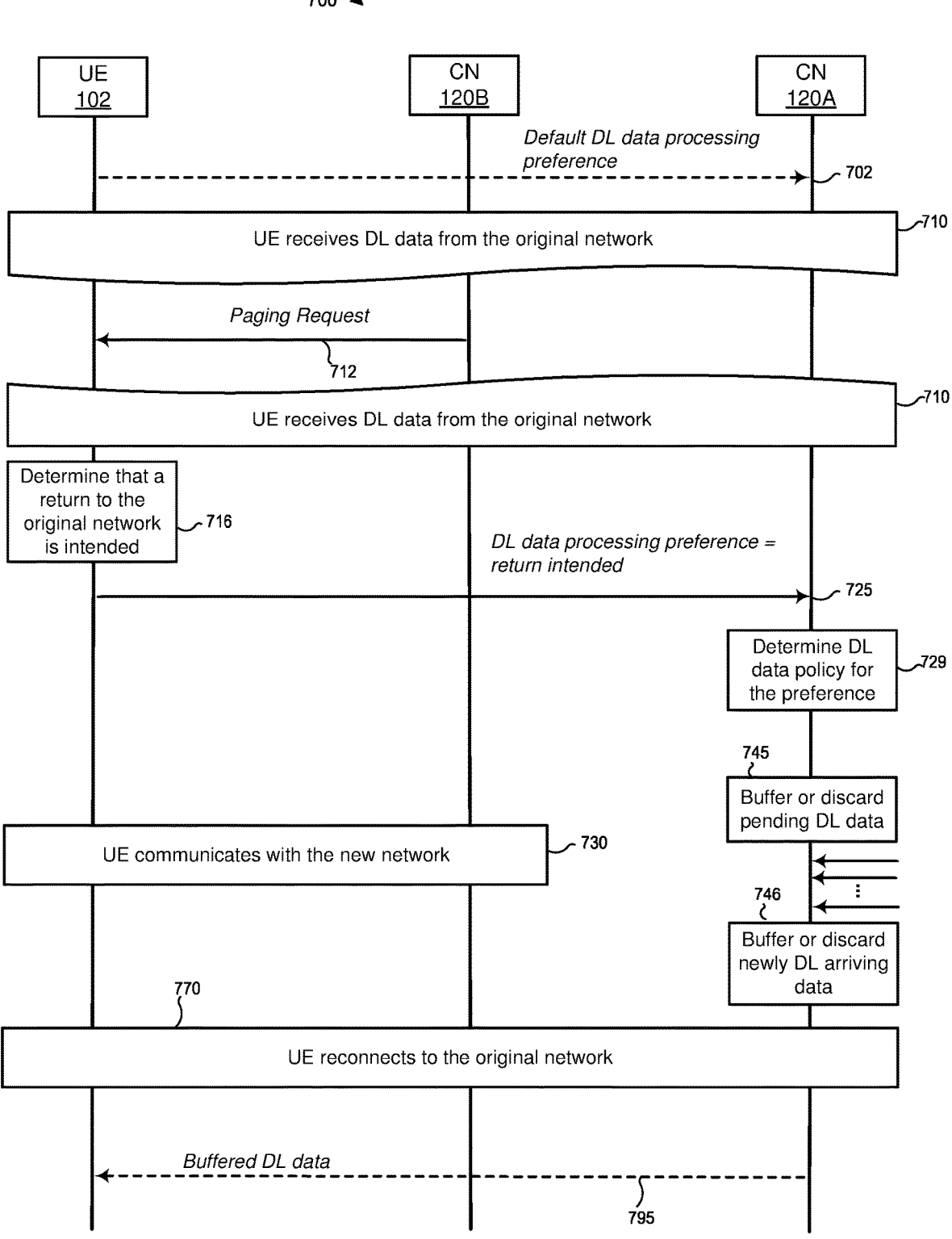
FIG. 7 is a message sequence diagram of a scenario in which the UE indicates, to the mobile network, its intent to return or not return to the mobile network after the UE connects to another mobile network.

Next, FIG. 7 illustrates an example scenario 700 also similar to the scenario 300, but with the UE 102 specifying the preference in terms of the intent to return to the original mobile network after temporarily connecting to a new mobile network. The UE 102 determines 716 that the UE 102 intends to return to the CN 120A after receiving the information to which the paging request relates within the predetermined time period T$_{MAX}$. The UE 102 transmits 725 a preference indication that specifies the intent of the UE to return to the CN 102A. The CN 120A then determines 720 the downlink data policy for the preference, based on applicable CN rules and/or settings specific to the UE 102. The CN 120A buffers or discards 745 the pending downlink data and buffers or discards 746 the newly arriving downlink data, in accordance the preference of the event 725 and the determination of the event 720. After the UE 102 reconnects 770 to the CN 120A, the CN 120A transmits 795 the buffered downlink data, when applicable.

Figure 8:
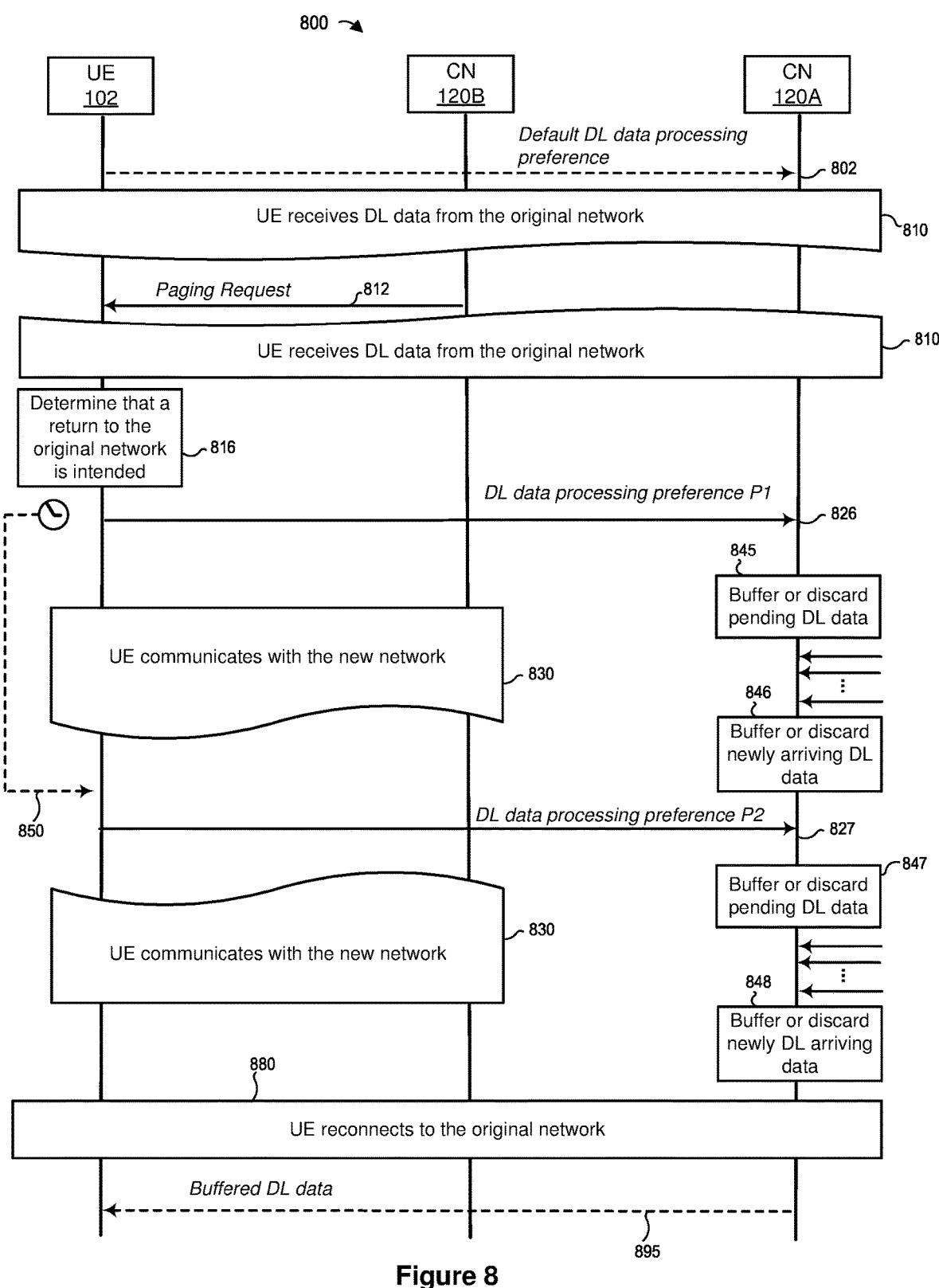
FIG. 8 is a message sequence diagram of a scenario in which the UE notifies the mobile network of an update to the preference of the UE regarding processing downlink data.

FIG. 8 illustrates an example scenario 800 similar to the scenario 300, but with the UE 102 updating its preference after specifying the initial preference to the original mobile network. The UE 102 determines 816 that the UE 102 intends to return to the CN 120A after receiving the information to which the paging request relates, within the predetermined time period T$_{MAX}$. The UE 102 transmits 826 its initial preference P$_1$ to the CN 120A and activates a timer 850, which can have the expiration time of T$_{MAX}$ or, in some scenarios, another expiration time. When the timer 850 expires, the UE 102 determines that the communication procedure 830 with the CN 120B is still ongoing. The UE 102 in response transmits an updated preference P$_2$ to the CN 120A. In some cases, the updated preference is the same as the original preference. In other cases, the UE 102 changes the preference due to the expected expiration of application-level timers, for example, which would cause the corresponding application to discard the buffered data in any case. As illustrated in FIG. 8, the CN 120A buffers or discards 845 the pending downlink data and buffers or discards 846 the newly arriving downlink data in accordance the preference indicated in the event 826, and then buffers or discards 847 the pending downlink data and buffers or discards 848 the newly arriving downlink data in accordance the preference indicated in the event 827. If the CN 120A has its own buffer size limit for storing downlink data for a UE, the CN 120A may override the preferences received 826, 827 when they exceed the CN 120A buffer size.

Figure 9:
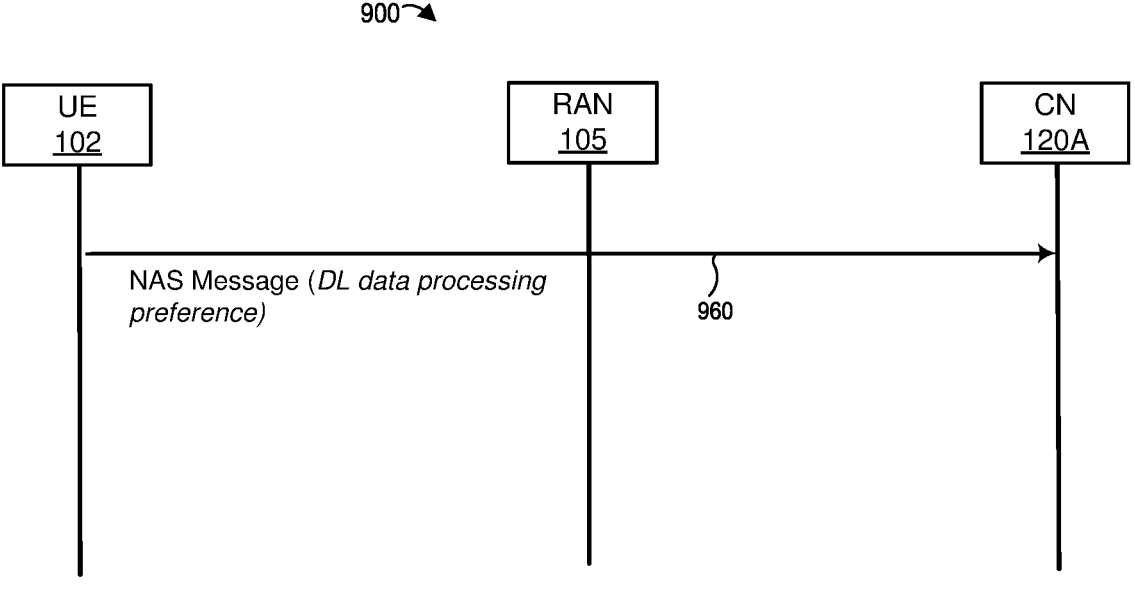
FIG. 9 is a message sequence diagram of a scenario in which the UE notifies the CN of the downlink data processing preference of the UE using a Non-Access Stratum (NAS) message.

For clarity, FIG. 9 illustrates a message sequence diagram of a scenario 900 in which the UE notifies 960 the CN 120A of the downlink data processing preference of the UE 102 using a NAS message. Although the UE 102 communicates with the CN 120A only indirectly, via a radio interface between the UE 102 and the RAN 105 (e.g., the base station 104), the RAN 105 in this scenario does not process the indication of downlink data processing preference and only forwards the preference to the CN 120A.

Figure 10:
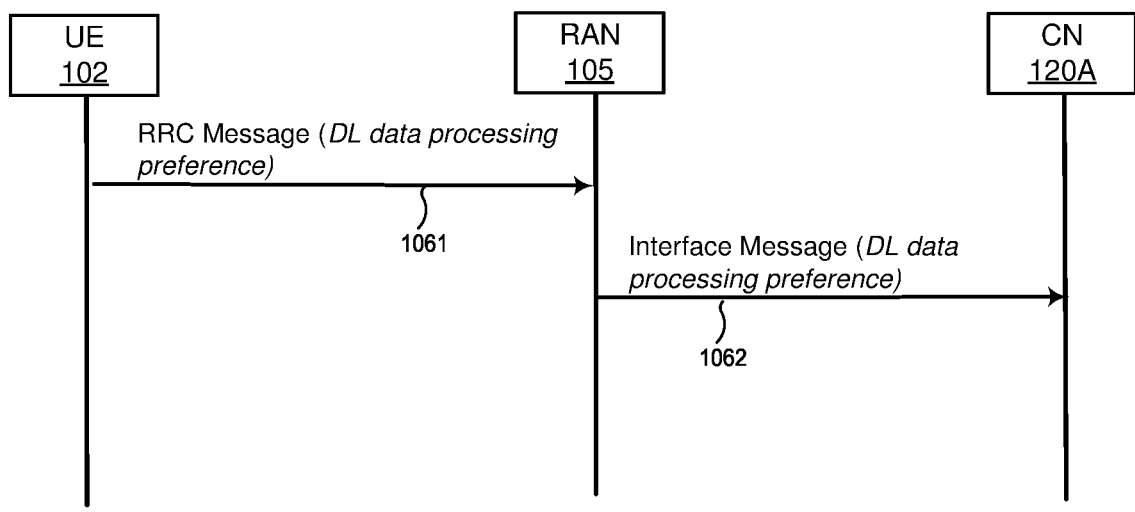
FIG. 10 is a message sequence diagram of a scenario in which the UE notifies the CN of the downlink data processing preference of the UE using a Radio Resource Control (RRC) message, via the RAN.

On the other hand, FIG. 10 illustrates a message sequence diagram of a scenario 1000 in which the UE 102 transmits 1061 an RRC message with an indication of the downlink data processing preference of the UE 102 to the RAN 105. The base station 104, or another node in the RAN 105, processes the indication, formats an interface message including the indication (or another, differently formatted indication based on the indication received from the UE 102), and transmits 1062 the interface message to the CN 120A.

For additional clarity, example methods which the UE 102 and the CN 120A of FIG. 1 can implement to support downlink data processing preferences of this disclosure are discussed with reference to FIGS. 11 and 12, respectively. These methods can be implemented as software instructions stored on a computer-readable medium and executed by one or more processors, for example. Although these methods are discussed below with specific reference to the UE 102 and the CN 120A, these methods also can be implemented in other suitable devices.

Figure 11:
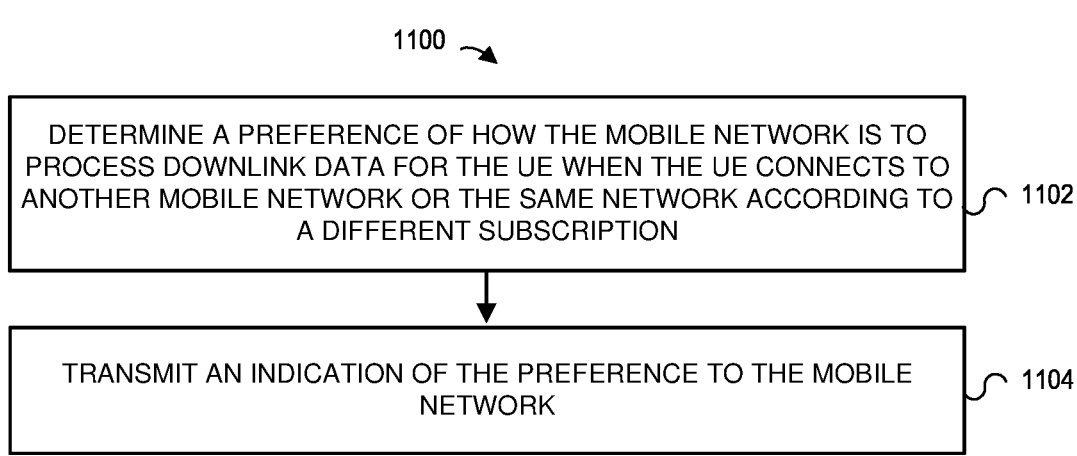
FIG. 11 is a flow diagram of an example method in a UE for configuring a mobile network to process downlink data in view of a preference of the UE, when the UE transitions to another mobile network.

Referring first to FIG. 11, the UE 102 can implement an example method 1100 to request that a mobile network process downlink data in view of a preference of the UE 102, when the UE 102 transitions to another mobile network. At block 1102, the UE 102 determines a preference of how the mobile network should process downlink data for the UE 102, for those situations where the UE 102 transitions to another mobile network (or the same mobile network according to a different subscription) only temporarily (see, e.g., event 316 in FIG. 3, event 416 in FIG. 4, event 516 in FIG. 5, event 617 in FIG. 6, event 716 in FIG. 7, or event 816 in FIG. 8).

At block 1102, the UE transmits an indication of the preference to the CN 120A of the original mobile network (see, e.g., event 302 or 320 of FIG. 3, event 402 or 421 of FIG. 4, event 502 of 522 of FIG. 5, event 602 or 623 of FIG. 6, event 702 or 725 of FIG. 7, event 802, 826, or 827 of FIG. 8, event 960 of FIG. 8, event 1061 of FIG. 10).

Figure 12:
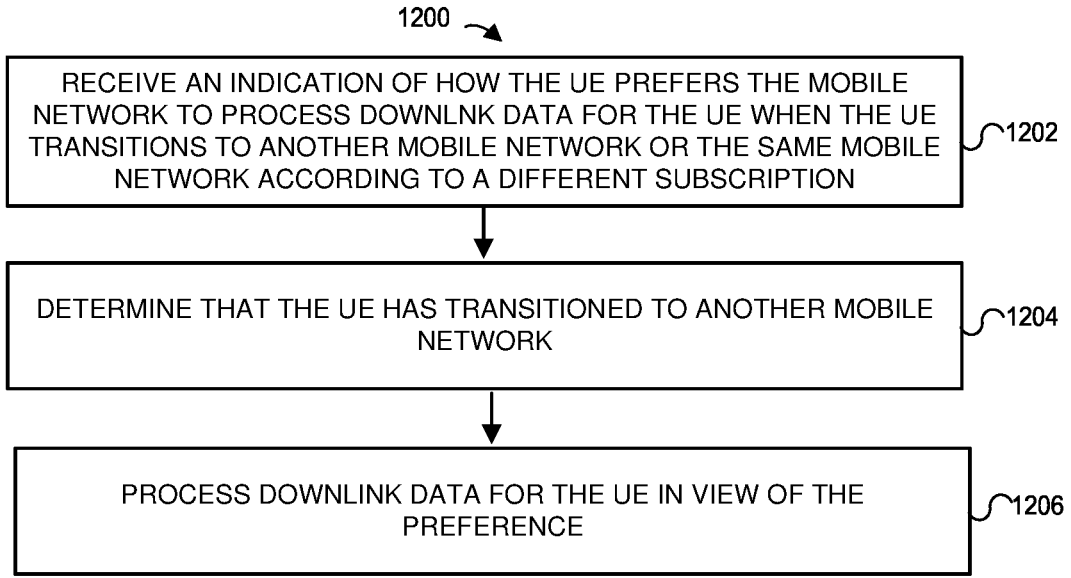
FIG. 12 is a flow diagram of an example method in a mobile network for processing downlink data for a UE, when the UE transitions to another mobile network.

Finally, FIG. 12 illustrates a flow diagram 1200 of an example method in a mobile network for processing downlink data for the UE 102, when the UE 102 transitions to another mobile network or the same mobile network according to a different subscription. At block 1202, the mobile network receives an indication of a preference of how the mobile network should process downlink data for the UE 102, for those situations where the UE 102 transitions to another mobile network only temporarily (see, e.g., event 302 or 320 of FIG. 3, event 402 or 421 of FIG. 4, event 502 of 522 of FIG. 5, event 602 or 623 of FIG. 6, event 702 or 725 of FIG. 7, event 802, 826, or 827 of FIG. 8, event 960 of FIG. 8, event 1061 of FIG. 10).

At block 1204, the mobile network determines that the UE 102 has transitioned to another mobile network. To avoid clutter, the events associated with notifying the CN 120A of the UE 102 temporarily leaving PLMN$_1$ are not shown separately, but in some implementations the UE 102 includes an indication of the preference regarding processing downlink data in a notification that the UE 102 is temporarily leaving PLMN$_1$ (see, e.g., event 302 or 320 of FIG. 3, event 402 or 421 of FIG. 4, event 502 of 522 of FIG. 5, event 602 or 623 of FIG. 6, event 702 or 725 of FIG. 7, event 802, 826, or 827 of FIG. 8, event 960 of FIG. 8, event 1061 of FIG. 10).

At block 1206, the CN 120A processes downlink data for the UE 102 in view of the preference (see, e.g., events 340 and 342 of FIG. 3, events 440 and 443 of FIG. 4, events 541 and 542 of FIG. 5, events 641 and 643 of FIG. 6, events 745 and 746 of FIG. 7, events 845-848 of FIG. 8). As discussed above, the CN 120A may not always comply with the preference of the UE due to conflicts with the policy of the CN, restrictions of the UE, exceeding data limits, etc.

The following additional considerations apply to the foregoing discussion.

A user device or UE in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code, or machine-readable instructions stored on non-transitory machine-readable medium) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC), a digital signal processor (DSP), etc.) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

The following list of examples reflects a variety of the embodiments explicitly contemplated by the present disclosure.

Example 1. A method in a UE having a first subscriber identity module for connecting to a first mobile network according to a first subscription and a second subscriber identity module for connecting to the first mobile network or a second mobile network according to a second subscription, the method comprising: determining, by processing hardware, a preference of how the first mobile network is to process downlink data for the UE when the UE transitions from the first subscription to the second subscription; and transmitting, by the processing hardware and to the first mobile network, an indication of the preference, to cause the first mobile network to process the downlink data for the UE based at least in part on the preference.

Example 2. The method of example 1, wherein the transmitting is in response to detecting an event indicating that the UE is to transition or has transitioned from the first subscription to the second subscription.

Example 3. The method of example 2, further comprising: assigning a first value to the indication in response to determining that the UE intends to return to the first subscription within a certain period of time; and assigning a second value to the indication in response to determining that the UE does not intend to return to the first subscription within a certain period of time.

Example 4. The method of example 3, wherein determining that the UE intends to return to the first subscription within the certain period of time includes detecting a paging request from the second subscription, the paging request related to a short message service (SMS).

Example 5. The method of example 3, wherein determining that the UE intends to return to the first subscription within the certain period of time includes detecting a paging request associated with the second subscription, the paging request related to a voice call.

Example 6. The method of example 2, further comprising: assigning a value to the indication based on (i) determining whether the UE intends to return to the first subscription within a certain period of time, and (ii) a default setting stored at the UE.

Example 7. The method of example 6, wherein the default setting specifies: a first default action for the pending downlink data, and a second default action the newly arriving downlink data; wherein each of the first default action and the second default action is one of discard, buffer, or "do not care."

Example 8. The method of example 2, further comprising: starting a timer in response to detecting the event; in response to the timer expiring, determining whether the UE fulfilled an intent to return to the first subscription or remain in the second subscription; and in response to determining that the UE did not fulfill the intent: determining, by processing hardware, an updated preference of how the first mobile network is to process downlink data for the UE, and transmitting, by the processing hardware and to the first mobile network, an indication of the updated preference.

Example 9. The method of example 1, including: assigning a value to the indication based on a default setting stored at the UE; and transmitting the indication of the preference prior to detecting an event indicating that the UE is to transition from the first subscription to the second subscription.

Example 10. The method of any of the preceding examples, wherein determining the preference includes determining that the first mobile network is to discard or retain all of the downlink data received from a core network (CN).

Example 11. The method of any of examples 1-9, wherein determining the preference includes identifying one or more Protocol Data Unit (PDU) sessions or Packet Data Network (PDN) connections for which the first mobile network is to discard or retain downlink data.

Example 12. The method of any of examples 1-9, wherein determining the preference includes identifying one or more Quality of Service (Qos) flows or Evolved Packet Switch (EPS) bearers for which the first mobile network is to discard or retain downlink data.

Example 13. The method of any of the preceding examples, wherein determining the preference includes determining whether pending downlink data is to be buffered or discarded.

Example 14. The method of any of the preceding examples, wherein determining the preference includes determining whether newly arriving downlink data is to be buffered or discarded.

Example 15. The method of any of the preceding examples, wherein transmitting the indication includes transmitting a Non-Access Stratum (NAS) message to a CN of the first mobile network, the NAS message including the indication.

Example 16. The method of any of examples 1-14, wherein transmitting the indication includes transmitting a message associated with a protocol for controlling radio resources.

Example 17. The method of any of the preceding examples, further comprising: receiving, from the CN of the first mobile network, an indication of a maximum amount of time during which the CN is configured to buffer downlink data.

Example 18. The method of any of the preceding examples, further comprising: receiving, from the CN of the first mobile network, an indication of a maximum buffer size for downlink data available for the UE at the CN.

Example 19. A user equipment (UE) comprising processing hardware and configured to implement a method of any of the preceding examples.

Example 20. A method in a first mobile network for processing downlink data for a user equipment (UE) having a first subscriber identity module for connecting to the first mobile network according to a first subscription and a second subscriber identity module for connecting to the first mobile network or a second mobile network according to a second subscription, the method comprising: receiving, by processing hardware from the UE, an indication of how the UE prefers the first mobile network to process downlink data for the UE when the UE transitions from the first subscription to the second subscription; and processing, by the processing hardware, downlink data for the UE based at least part on the indication.

Example 21. The method of example 20, wherein receiving the indication includes determining that the UE prefers that the first mobile network discard all of the downlink data received from a CN.

Example 22. The method of example 20, wherein receiving the indication includes determining that the UE prefers that the first mobile network retain all of the downlink data received from a CN.

Example 23. The method of example 20, wherein the indication specifies one or more PDU sessions or PDN connections for which the first mobile network is to discard downlink data.

Example 24. The method of example 20, wherein the indication specifies one or more PDU sessions or PDN connections for which the first mobile network is to retain downlink data.

Example 25. The method of example 20, wherein the indication specifies or more QoS flows or EPS bearers for which the first mobile network is to discard downlink data.

Example 26. The method of example 20, wherein the indication specifies or more QoS flows or EPS bearers for which the first mobile network is to retain downlink data.

Example 27. The method of any of examples 20-26, wherein processing the downlink data includes buffering pending downlink data.

Example 28. The method of example 27, further including: limiting the buffering based on at least one of (i) buffer size or (ii) time.

Example 29. The method of any of examples 20-26, wherein processing the downlink data includes discarding pending downlink data.

Example 30. The method of any of examples 20-29, wherein processing the downlink data includes buffering newly arriving downlink data.

Example 31. The method of any of examples 20-29, wherein processing the downlink data includes discarding newly arriving downlink data.

Example 32. The method of any of examples 20-31, further comprising: in response to determining that the indication has a first value, determining that the UE intends to return to the first mobile network within a certain period of time.

Example 33. The method of any of examples 20-31, further comprising: in response to determining that the indication has a second value, determining that the UE does not intend to return to the first subscription within a predetermined period of time.

Example 34. The method of any of examples 20-33, wherein receiving the indication includes receiving a NAS message, the NAS message including the indication.

Example 35. The method of any of examples 20-33, wherein receiving the indication includes transmitting a message associated with a protocol for controlling radio resources.

Example 36. The method of any of examples 20-35, further comprising: detecting, by the processing hardware, that the UE has transitioned from the first mobile network to the second mobile network.

Example 37. A base station comprising processing hardware and configured to implement a method of any of examples 20-36.

What is claimed is:

1. A method in a user equipment (UE), the method comprising:

transitioning, by the UE having a first subscriber identity module for connecting to a first mobile network according to a first subscription and a second subscriber identity module for connecting to a second mobile network according to a second subscription, from the first subscription to the second subscription; and in view of the transitioning, transmitting, by the UE to the first mobile network, an indication of a preference of how the first mobile network is to process downlink data for the UE, the indication of the preference including:

a first value for a first default action for pending downlink data, and a second value for a second default action for newly arriving downlink data.

2. The method of claim 1, wherein:

the transitioning from the first subscription to the second subscription includes:

assigning the second value to the indication.

3. The method of claim 1, wherein the indication further includes the first value in response to determining that the UE intends to return to the first subscription within a predetermined period of time, wherein the determining includes detecting a paging request from the second subscription prior to the transitioning.

4. The method of claim 1, further comprising:

including the first value or the second value in the indication based on:

determining whether the UE intends to return to the first subscription within a predetermined period of time, and a default setting stored at the UE, wherein the default setting specifies:

the first default action for pending downlink data, and the second default action for newly arriving downlink data, wherein each of the first default action and the second default action is one of discard, buffer, or "do not care".

5. The method of claim 1, wherein determining the preference includes identifying one or more Protocol Data Unit (PDU) sessions or Packet Data Network (PDN) connections for which the first mobile network is to discard or retain downlink data.

6. The method of claim 1, wherein determining the preference includes identifying one or more Quality of Service (QOS) flows or Evolved Packet Switch (EPS) bearers for which the first mobile network is to discard or retain downlink data.

7. The method of claim 1, wherein determining the preference includes determining whether pending downlink data is to be buffered or discarded.

8. The method of claim 1, wherein determining the preference includes determining whether newly arriving downlink data is to be buffered or discarded.

9. The method of claim 1, further comprising:

receiving, from a core network (CN) of the first mobile network, an indication of a maximum amount of time during which the CN is configured to buffer downlink data.

10. The method of claim 1, wherein the second mobile network is the same as the first mobile network.

11. A user equipment (UE) comprising:

a first subscriber identity module for connecting to a first mobile network according to a first subscription;

a second subscriber identity module for connecting to the first mobile network or a second mobile network according to a second subscription; and processing hardware to:

determine a preference of how the first mobile network is to process downlink data for the UE when the UE transitions from the first subscription to the second subscription; and transmit, to the first mobile network, an indication of the preference, to cause the first mobile network to process the downlink data for the UE, the indication of the preference including:

a first value for a first default action for pending
downlink data, and a second value for a second default action for newly
arriving downlink data.

12. The UE of claim 11, wherein:

the indication of the preference includes assigning a third
value to the indication in response to determining that
the UE intends to return to the first subscription within
a known period, and the transmitting further includes assigning a fourth value
to the indication in response to determining that the UE
does not intend to return to the first subscription within
the known period of time.

13. The UE of claim 12, wherein the processing hardware
determines that the UE intends to return to the first sub-
scription within the known period of time by detecting a
paging request from the second subscription, the paging
request related to a short message service (SMS).

14. The UE of claim 11, wherein the processing hardware
is further configured to:

assign the first value or the second value to the indication
based on:

determining whether the UE intends to return to the
first subscription within a known period of time, and a default setting stored at the UE, wherein the default
setting specifies:

a first default action for pending downlink data, and a second default action for newly arriving downlink
data, wherein each of the first default action and the second
default action is one of discard, buffer, or "do not
care".

15. The UE of claim 11, wherein the processing hardware
determines the preference by identifying one or more Pro-
tocol Data Unit (PDU) sessions or Packet Data Network
(PDN) connections for which the first mobile network is to
discard or retain downlink data.

16. A method in a first mobile network for processing
downlink data for a user equipment (UE), the method
comprising:

receiving, by the first mobile network from the UE, an
indication of how the UE prefers a first mobile network
to process downlink data for the UE when the UE
transitions from a first subscription about the first
mobile network to a second subscription about a second
mobile network when the UE includes a first subscriber
identity module for connecting to the first network
according to the first subscription and a second sub-
scriber identity module for connecting to the second mobile network or the first mobile network according
to the second subscription, the indication including:

a first value for a first default action for pending
downlink data, and a second value for a second default action for newly
arriving downlink data; and processing, by the first mobile network, downlink data for
the UE based at least part on the indication.

17. The method of claim 16, wherein the indication
specifies that the UE prefers that the first mobile network
discard downlink data received from a core network (CN).

18. The method of claim 16, wherein the indication
specifies that the UE prefers that the first mobile network
retain downlink data received from a CN.

19. The method of claim 16, wherein the indication
specifies at least one of:

one or more protocol data unit (PDU) sessions or packet
data network (PDN) connections for which the first
mobile network is to discard downlink data, one or more PDU sessions or PDN connections for which
the first mobile network is to retain downlink data, one or more quality of service (QoS) flows or EPS bearers
for which the first mobile network is to discard down-
link data, or one or more QoS flows or EPS bearers for which the first
mobile network is to retain downlink data.

20. A network entity for processing downlink data for a
user equipment (UE), the network entity comprising:

a memory; and a processor coupled to the memory, the processor and the
memory configured to:

receive an indication of how the UE prefers a first
mobile network to process downlink data for the UE
when the UE transitions from a first subscription to
a second subscription when the UE includes a first
subscriber identity module for connecting to the first
network according to the first subscription and a
second subscriber identity module for connecting to
a second mobile network or the first mobile network
according to the second subscription, the indication
including:

a first value for a first default action for pending
downlink data, and a second value for a second default action for newly
arriving downlink data; and process downlink data for the UE based at least part on
the indication.

* * * * *